United States Patent [19]
Dyke

[11] Patent Number: 6,069,922
[45] Date of Patent: May 30, 2000

[54] METHOD AND APPARATUS FOR REDUCING CROSS-TALK IN BROADBAND SYSTEMS USING LINE-CODING

[75] Inventor: Peter John Dyke, Widdington, United Kingdom

[73] Assignee: Nortel Networks Corporation, Montreal, Canada

[21] Appl. No.: 08/969,886

[22] Filed: Nov. 14, 1997

[51] Int. Cl.[7] ................................................. H04B 15/00
[52] U.S. Cl. ........................ 375/285; 375/222; 370/204; 370/487; 370/490
[58] Field of Search .................................. 375/222, 261, 375/285; 370/203, 204, 487, 490, 210

[56] References Cited

U.S. PATENT DOCUMENTS

| | | |
|---|---|---|
| 4,113,987 | 9/1978 | Samuelsson . |
| 4,220,816 | 9/1980 | Howells et al. . |
| 5,084,903 | 1/1992 | McNamara et al. ..................... 375/290 |
| 5,412,689 | 5/1995 | Chan et al. . |
| 5,594,726 | 1/1997 | Thompson et al. ..................... 370/485 |
| 5,764,699 | 6/1998 | Needham et al. ....................... 375/261 |
| 5,796,716 | 8/1998 | Smith ...................................... 370/207 |
| 5,970,088 | 10/1999 | Chen ...................................... 375/222 |

FOREIGN PATENT DOCUMENTS

| | | |
|---|---|---|
| 2 311 196 | 9/1997 | United Kingdom . |
| 98/10528 | 3/1998 | WIPO . |

*Primary Examiner*—Stephen Chin
*Assistant Examiner*—Lenny Jiang
*Attorney, Agent, or Firm*—Lee, Mann, Smith, McWilliams, Sweeney & Ohlson

[57] ABSTRACT

To accommodate the overlay of broadband information over narrowband bearers while reducing cross-talk in upstream and downstream directions, different baseband line codes are used to modulate respective upstream and downstream transmissions on a common wireline communication resource, such as a twisted copper-pair. In this way, filtering components located at each end of a connection can reject cross-talk based upon dissimilar signal characteristics that arise between wanted broadband signals having a first baseband line code and spectrally-shifted cross-talk emanating from interfering broadband signals having a different baseband line code.

21 Claims, 3 Drawing Sheets

METHOD AND APPARATUS FOR REDUCING CROSS-TALK IN BROADBAND SYSTEMS USING LINE-CODING

BACKGROUND TO THE INVENTION

This invention relates, in general, to the use of line codes and the performance of telecommunication networks that transmit broadband signals over twisted copper-pairs, and is particularly, but not exclusively, applicable to the use of digital subscriber line (xDSL) communication protocols in bidirectional systems in which signal interference corrupts the integrity of transmitted data.

SUMMARY OF THE PRIOR ART

Telecommunication systems that interconnect wireline subscriber terminals are capable of supporting broadband data communication More particularly, recent developments in broadband communication protocols allow broadband data to be overlaid on narrowband voice or integrated service digital network (ISDN) traffic Specifically, the interconnection of broadband modems located at the subscriber terminal and at an exchange allow current broadband access systems to communicate on spare spectrum (i.e. spare frequency channels) of a twisted copper-pair communication resource, the spare frequency channels being isolated from conventionally encoded voice signals by a suitable filter. In this respect, and depending upon the complexity of the xDSL coding scheme, overlaid broadband systems can support data rates in excess of 2 Megabits per second (Mbps), although this rate is dependent upon the length of the twisted copper-pairs For example, Asynchronous Digital Subscriber Line (ADSL) and High-speed Digital Subscriber Line (HDSL) protocols cain support data rates of 2 Mbps over distances of approximately three kilometers, while more complex schemes (such as ADSL) can support data rates of 8 Mbps over distances of, typically, less than two kilometers. In the latter instance, protocols such as Very-high speed Digital Subscriber Line (VDSL) utilise multiple sub-channel carriers, e.g. in a discrete multi-tone (DMT) environment, to provide an adaptive system that mitigates the effects of cross-talk by selectively ignoring noise-effected sub-channel carriers. However, multicarrier schemes are inherently more wasteful of spectrum because of the requirement for a discrete sub-channel spacing, although protocols (such as HDSL) still utilize wide blocks of baseband bandwidth. Furthermore, the more complex and elaborate xDSL schemes, such as VDSL, require greater digital signal processing (DSP) power which therefore has a detrimental cost implication associated with providing suitable semiconductor chips for the requisite broadband xDSL modems. Indeed, the monetary cost is sufficiently high so as to effect the commercial viability and deployment of overlaid broadband systems, while the increased processing power also causes thermal management and power dissipation problems. Moreover, in equipment having battery-powered energy supplies, the increase in processing power can have a detrimental effect on equipment operating time.

The skilled addressee will appreciate that baseband line coding schemes, such as 2B1Q (which will be described later), provide lower data rate broadband access systems that currently prevail in existing telecommunication networks, while modulation schemes such as Carrierless Amplitude-Phase (CAP) modulation. Quadrature Amplitude (QAM) modulation and DMT support the more elaborate xDSL schemes. However, while baseband xDSL protocols are sufficiently robust to support symmetrical data rate transmissions and also provide some limited immunity against noise and general radio frequency interference (RFI), baseband line coding technologies are unfortunately susceptible to cross-talk. For reasons of simplified system design and ease of system testing, a common line code is used for traffic in both directions of each twisted copper-pair.

As previously stated, current HDSL systems typically utilise baseband line (transmission) codes, such as 2B1Q, over one to three twisted copper-pairs. For a single pair system, each twisted copper-pair therefore provides duplex operation at 2 Mbps, for example. In relation to 2B1Q coding, two binary symbols are converted into one quaternary (4-level) line code to reduce the bit rate by half and therefore to save considerable bandwidth. However, with bidirectional communication, the relative location of the opposing lines in each twisted copper-pair causes cross-talk interference to be induced into proximately located wireline communication resources, principally by the mechanisms of capacitive and inductive coupling and by radiation (arising from the imperfect nature and performance of the cabling).

There are two forms of cross-talk that need to be considered; namely Near-End Cross-Talk (NEXT) and Far-End Cross-Talk (FEXT) NEXT occurs when electromagnetic interference (i.e. noise) is induced into a wireline resource that is communicating information in an opposing direction, e.g. downstream (or down-link) information appears as noise in an upstream (or up-link) path and therefore appears at an input to the receiving device. On the other hand, FEXT occurs when electromagnetic interference (i.e. noise) is induced into a wireline resource that is communicating information in a similar direction, e.g. downstream (or down-link) information appears as noise in another downstream wireline resource. Consequently, FEXT appears at a non-addressed input of a receiving device. The latter form of cross-talk (i.e. FEXT) is of less concern because its effects are reduced by attenuation present in the transmission path In summary, NEXT interferes with received signals that are reflected back into a device and takes the form of a transmitted spectrum that rises at a rate of six decibels (dB) per octave.

For an alternate mark invert (AMI) line code in which consecutive logical (binary) 1s are alternated between ±1 in a ternary level modulation scheme, or 2B1Q as used in HDSL, cross-talk is further exacerbated by the frequency attenuation characteristics of the cable. Indeed, the level of attenuation in twisted copper-pairs is such as to require equalization of the received signal prior to detection at a receiver. In fact, NEXT increases significantly the higher frequency components of the received signal, which shaping of the higher frequency components limits the performance of baseband line coded systems (principally because of the similar signal profiles of the received signal and the NEXT).

In an attempt to address the problems associated with cross-talk in baseband line coded systems, some manufacturers have resorted to echo-cancellation techniques. Unfortunately, while echo cancellation compensates a particular twisted copper-pair for its return duplex path, echo cancellation does not mitigate or even address the effects caused by cross-talk induced by other distinct systems, i.e. other twisted copper-pairs. Furthermore, echo cancellation techniques are generally expensive.

As will also be widely appreciated, broadband access schemes require a channel response that satisfies Nyquist's criteria, namely that to recover data accurately one must have a channel response profile in which the transmission bit-rate frequency is limited to no more than half its initial value (i.e. a 6 dB drop-off point) for the power spectral density at the transmitted half bit rate frequency An additional requirement is that, after this 6 dB point, the channel response should roll-off as quickly as possible in order to minimize the level of cross-talk noise (and therefore to improve the signal-to-noise ratio).

A need therefore exists for an improved broadband access scheme that reduces cross-talk, generally, and which therefore improves system performance. Preferably, the improved system should maintain broadband line coding techniques so as to benefit from lower cost silicon and to obviate both thermal and power management problems associated with high-speed DSPs.

SUMMARY OF THE INVENTION

According to a first aspect of the present invention there is provided a communication system comprising a first communication unit coupled to a second communication unit through a communication resource supporting communication in an upstream direction and a downstream direction between the first communication unit and the second communication unit, the first communication unit and the second communication unit being arranged to modulate information onto the communication resource using a first coding scheme for the upstream direction and a different coding scheme for the downstream direction such that cross-talk interference between the upstream direction and the downstream direction is reduced.

In a preferred embodiment, the first communication unit may an intermediate unit (typically an infrastructure exchange) that has a plurality of wireline resources connected thereto that support a plurality of calls. The intermediate unit further contains a controller arranged to select a coding scheme from the at least two coding schemes such as to minimize cross-talk interference between the plurality of calls. Preferably, the coding scheme is selected based upon routing information pertaining to the second communication unit to which the intermediate unit is to send the modulated information.

In another aspect of the present invention there is provided a communication device for coupling to a wireline resource, the communication device arranged to transmit and receive modulated data through the wireline resource in an uplink direction and a downlink direction and wherein received modulated data is corrupted by cross-talk interference between the uplink direction and the downlink direction, the communication device containing: a controller: and a memory, coupled to the controller, for storing a first coding scheme and at least one other different coding scheme, the first coding scheme and the at least one other different coding scheme being associated with one of the uplink direction and the downlink direction and each coding scheme having different signal modulation profiles associated therewith; wherein the controller is arranged to select and use different ones of the first coding scheme and the at least one other coding scheme for the respective transmission and reception of modulated data in the uplink direction and the downlink direction such that cross-talk interference can be distinguished and separated from received modulated data.

In a further aspect of the present invention there is provided a method of sending data between communication units interconnected by a wireline resource that supports upstream transmissions and downstream transmissions the method comprising the steps of selecting a first coding scheme having a first signal modulation profile for the upstream transmissions, selecting a second coding scheme having a different signal modulation profile for the downstream transmissions; and selectively applying an appropriate one of the first coding scheme and the second coding scheme to the data to modulate the data with respect to the upstream transmissions and to recover the data with respect to the downstream transmissions, whereby cross-talk interference between the upstream transmission and the downstream transmissions can be distinguished by said differing signal modulation profiles applied to said uplink transmission and said downlink transmissions.

In another aspect of the present invention there is provided a method of reducing cross-talk interference in upstream and downstream transmission of data signals between communication units interconnected by a wireline communication resource that supports an overlaying of broadband signals on narrowband signals, the method comprising the steps of applying different baseband line codes to modulate respective upstream and downstream transmissions on the wireline communication resource, the different baseband line codes exhibiting dissimilar signal characteristics; distinguishing the data signals from spectrally-shifted cross-talk interference by virtue of the dissimilar signal characteristics; and filtering the data signals received at the communication units to reject the cross-talk interference.

The present invention therefore advantageously reduces cross-talk in a line coded system thus improving data rates that can be supported by such line coded systems while maintaining distances over which such coding schemes can effectively be used The present invention is particularly applicable to broadband line coding architectures.

BRIEF DESCRIPTION OF THE DRAWING

An exemplary embodiment of the present invention will now be described with reference to the accompanying drawings, in which.

DETAILED DESCRIPTION OF A PREFERRED EMBODIMENT

Figure 1:
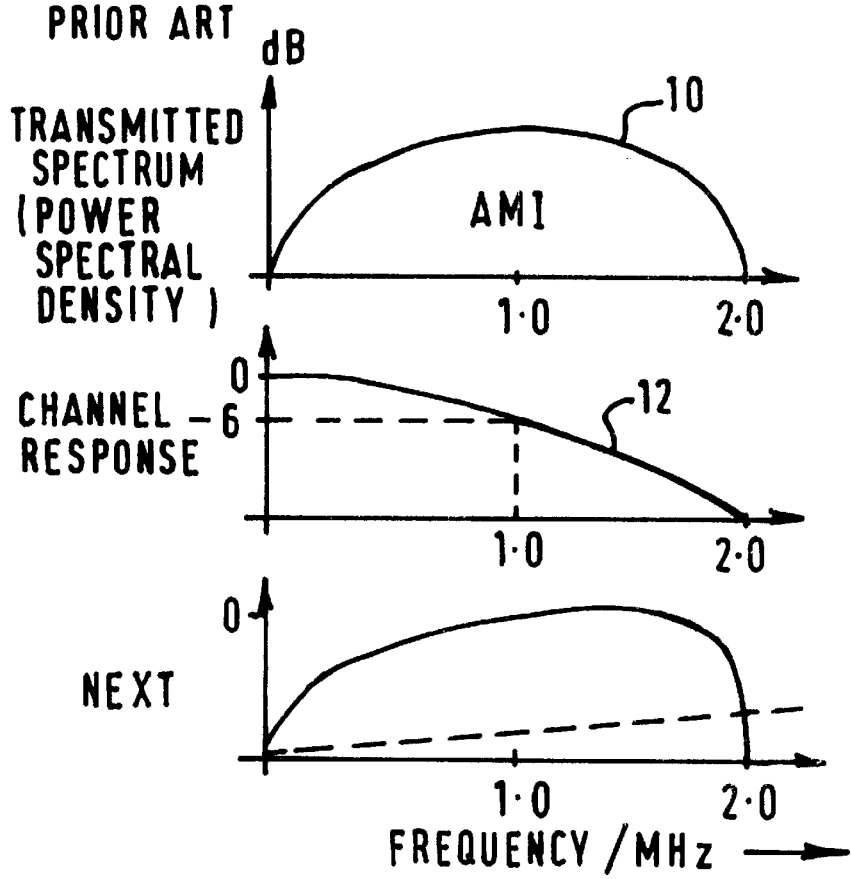
FIG. 1 shows waveform representations of an AMI coded signal, and signal profiles associated with an appropriate channel response and cross-talk interference.

Referring to FIG. 1. waveform representations of an AMI coded signal, a corresponding channel response and cross-talk interference are shown As can be seen a plot 10 of power spectral density against frequency yields an "n-shaped" profile that is centered (in this example) about a central frequency of 1.0 MHz. The power spectral density is approximately uniform about the central frequency and rises and falls fairly rapidly at the peripheries of the envelope. As expected, the required channel response curve 12 for the AMI system of FIG. 1 tails off with increasing frequency but nonetheless satisfies Nyquist's criteria. Finally, a plot of NEXT against frequency shows the 6 dB per octave rise and demonstrates the similarities in the profiles between a NEXT interference curve and the power spectral density of the transmitted signal.

The present invention has identified that the limitation in baseband line code performance emanates from the use of a common line code in both the upstream and downstream Consequently, the present invention allows different transmission directions to use different baseband line codes and hence different signal transmission characteristics The present invention therefore reduces cross-talk by effectively moving distinct upstream and downstream channels into different frequency domains As such, NEXT interference curves differ substantially in profile from the power spectral density of transmitted signals to an extent whereby the NEXT interference can be reduced by filtering or ignored by virtue that the frequency components of the NEXT interference are uncorrelated or orthogonal to the frequency components of interest in the transmitted signal.

Figure 2:
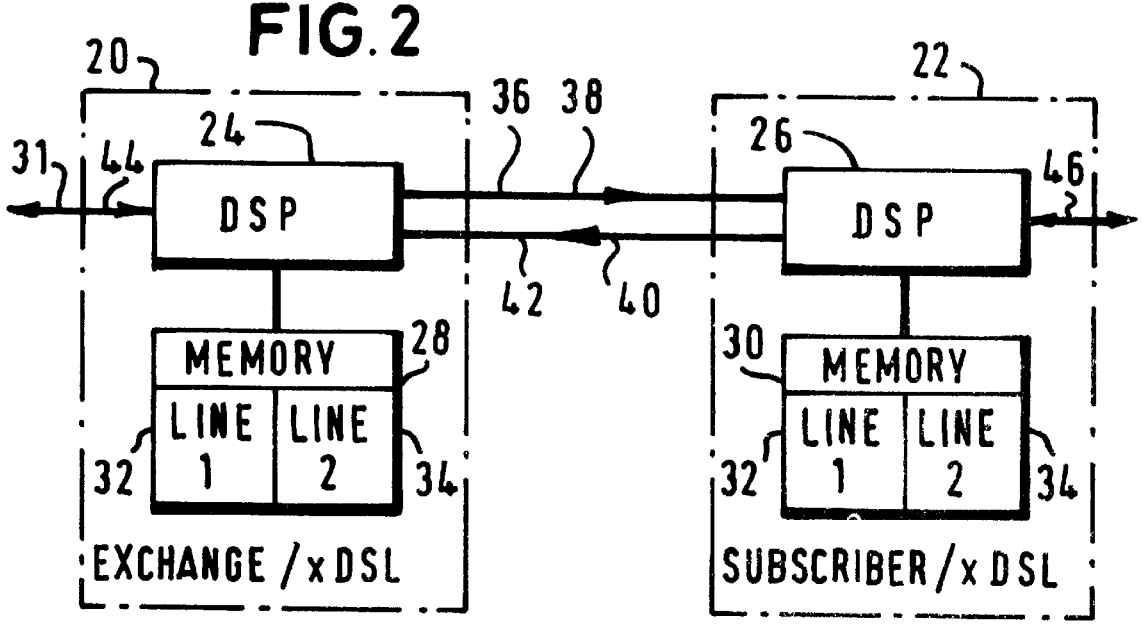
FIG. 2 shows a block diagram of a communication system according to a preferred embodiment of the present invention.

Turning to FIG. 2. a block diagram of a communication system according to a preferred embodiment of the present invention is shown For the sake of ease and brevity of description. FIG. 2 indicates a vastly simplified exchange 20 (or mobile switching centre, in the context of a cellular telephony environment) and an interconnected subscriber terminal 22. Clearly, the exchange 20 and the subscriber terminal 22 contain many functional blocks (as will be understood), but for the sake of the present invention we only need consider the provision of a broadband modem (at each end of the connection) and, more especially, interconnected digital signal processors 24–26, associated memory 28–30 and filtering components shaped to differentiate between wanted signals and noise, generally. The broadband modems implement baseband line coding, such as provided by the HDSL protocol The digital signal processors may be realised by discrete circuit components or may be incorporated within a control processor (or controller) that generally manages the operation of the communication unit. In the following description, therefore, reference to the term DSP should be construed broadly to represent and include the function of a more general controller.

Considering first the exchange 20, raw (unprocessed) signals 31 are received by the exchange 20 and ultimately supplied to the digital signal processor (DSP) 24 of the broadband modem for encoding with a baseband line code. The digital signal processor (DSP) 24 is coupled to a memory device 28 (which may be located internally as a memory cache) that stores at least two different baseband line codes 32–34 The DSP 24 also contains the necessary circuitry and functionality for any pre- filtering and post-filtering and any pre-encoding and post-encoding of the transmission signals. The selection of an appropriate baseband line code is entirely dependent upon the direction in which the modulated information is to be sent, which selection is generally controlled by DSP (or controller). For example, baseband line coding with a first line code 32 occurs when the exchange 20 sends modulated data 36 (output from the DSP 24) to the subscriber terminal 22 over a downstream 38 comprised from one communication resource of a twisted copper-pair. Conversely, in relation to an incoming upstream transmission 40 on a second communication resource 42 of a twisted copper-pair, the DSP 24 accesses and utilises the second line code 34 (stored in memory 34) to demodulate the incoming signal (i.e. the upstream transmission 40). Following demodulation (signal processing), a broadband information signal 44 is output from the exchange (or modem) 40 Clearly, the broadband information signal 44 may be output in serial or parallel fashion, and may contain information pertaining to video or other data services, including Internet information.

At the subscriber terminal 22, an appropriate broadband modem comprises a DSP 26 that is coupled to the downstream 38 for receipt of data. The DSP 26 is therefore arranged to decode the first baseband line code. In a similar fashion to the exchange 20, the DSP 26 of the subscriber terminal 22 is also coupled to a memory that contains at least two baseband line codes 32–34 that correspond to those baseband line codes stored in the memory associated with the exchange. In the case of the subscriber terminal 22, the selection of an appropriate baseband line code for use in the DSP 26 is entirely dependent upon whether modulated information 36 or raw (unmodulated) data 46 is received by the subscriber terminal. For example, baseband line decoding with the first line code 32 occurs when the exchange 20 receives modulated data 36 (output from the DSP 24), while baseband line coding with the second line code 34 takes place when an upstream communication to the exchange is required As such, the DSP 26 is also coupled to the upstream 40 and is responsive to a data input 46. Clearly, a broadband information signal 48 may be output (after demodulation in the modem of the subscriber terminal) in serial or parallel, and may contain information pertaining to video or other data services, including internet information.

The DSPs in the modems of the exchange 20 and subscriber terminal 22 also contain firmware that controls the coding and decoding processes, and are typically coupled to a control processor (not shown) that maintains overall operational control of the exchange 20 or subscriber terminal 22.

While it will be appreciated that any number of a selection of known line codes (each having different merits) can be implemented for use in each of the different upstream and downstream transmissions, the particular selection is based upon the desired effect that needs to be achieved. For example, downstream signals may be encoded with a partial response pre-encoder that shifts the main spectral content of the information signal down to lower frequencies and therefore lowers the required frequency response Upstream signals in the preferred embodiment of the present invention are transmitted using AMI line codes The upstream signals are received by the exchange (or other analogous distribution point). The channel response of the AMI upstream is significantly different to that for the downstream partial response pre-encoded line code, and consequently the lower frequency NEXT generated by the partial response pre-encoded line code is reduced.

A further technique may also be applied to the upstream AMI signal to reduce its sensitivity to NEXT and hence to improve performance. This technique is referred to as Low Frequency Restoration (LFR) and involves removing the low frequency analog signals (received at the upstream DSP) through the use of a high-pass filter located prior to a receiver detector This mechanism has the effect of removing both the lower frequency signals and any cross-talk that is present. The use of LFR allows these lower frequency signals to be restored digitally at the receiver detector through a filter connected from post-decision circuitry (e.g. digital flip-flops) to the receiver detection circuitry. More particularly, in relation to a binary line code, a received signal containing cross-talk is filtered in a high pass filter before being applied to amplifier and equaliser functions. Following equalisation, the now equalised signal is clocked into a D-type flip-flop, for example, with an output from the D-type flip-flop tapped and fed back (via an LFR filter) for re-combination with the equalised signal As will be understood, an output from the LFR filter is ostensibly free from noise, while the receiver decision point in located at the output of the amplifier and equaliser functions The LFR therefore replaces a lower part of the received signal's spectrum that was removed (along with the cross-talk) by a relatively clean digital signal (without cross-talk). Hence, the LFR process can be employed within the present invention, and is particularly beneficial when used, for example, with AMI or 2B1Q signals in the presence of lower frequency cross-talk, e.g. from pre-encoded partial response signals.

In relation to the NEXT at the subscriber terminal (i.e. in the downstream), this is caused by the upstream AMI signal that consequently generates noise (particularly cross-talk) at high frequencies due to the transmitted spectrum of AMI and the 6 dB per octave uplift. Much of the NEXT is therefore filtered out by an appropriately shaped downstream channel response filter. More particularly, a wanted downstream signal is isolated and recovered at the subscriber terminal using a partial response (class 1) roll-off channel response filter This type of transmission line code is used for the downstream direction for example, as a consequence of its capability to reduce the spectral bandwidth of the downstream signal and hence the channel response required to detect the downstream signal. This scheme also has the benefit of improving the signal to noise (S:N) ratio of the AMI upstream signal by reducing the cross-talk into the upstream direction.

The lowering of the downstream spectral bandwidth can be achieved through the use of partial response and a pre-coding filter, as described in UK patent number 2185663, for example.

Figure 3:
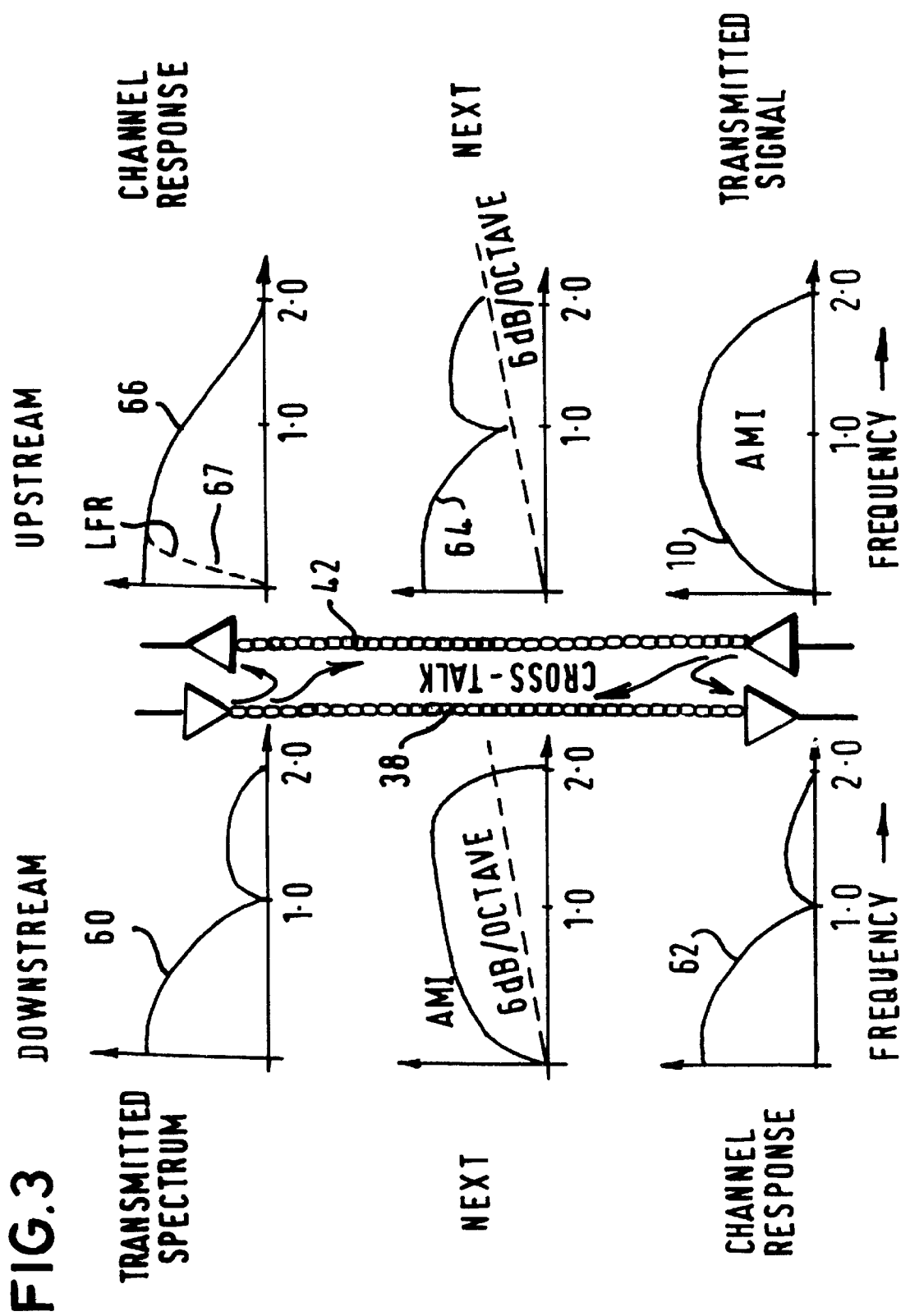
FIG. 3 shows how the communication system of FIG. 2 effects the signal profiles of downstream and upstream communications.

FIG. 3 shows how the communication system of FIG. 2 effects the signal profiles of downstream 38 and upstream 42 communications.

In the downstream 38, a transmitted spectrum 60 for a pre-encoded partial response code concentrates information at lower frequencies, with a power spectral density (on the ordinate-axis) indicating that, for an exemplary 2 Mbps signal power spectral density reaches a minimum at approximately a midpoint in the frequency band Following this minimum, the signal profile again rises in a second lobe, but this time in a parabolic form, before tailing off as an upper operating frequency is approached. The second lobe has a power spectral density that is relatively low with respect to a first lobe of the signal profile A channel response curve 62 can be of similar form, and hence can contain a double-lobed shape in which a lower frequency portion exhibits a greater proportion of the information-bearing signal. NEXT 64 generated by the partial response code used in the downstream (and having a signal profile resembling that of the double-lobed transmitted spectrum) does not however interfere in the downstream but instead affects the transmission in the upstream 42.

Considering now the upstream 42, AMI signal coding produces a transmitted spectrum 10 having an "n-shaped" profile, as previously shown and described in relation to FIG. 1. The power spectral density of the transmitted signal concentrates information in the mid-band of the channel. A channel response 66 for this form of AMI coding has a half bell-shaped profile as shown, which profile reduces at higher frequencies according to Nyquist's criteria. Furthermore, it is also possible to remove, as previously described, the lower frequencies using LFR, with the channel response characteristic altered by a drop-off to DC at low frequencies, the effect of introducing LFR is shown by the dotted line 67 that modifies the previous half bell-shaped profile.

As a consequence of the present invention, a signal profile of the NEXT of the AMI coded signal (again having an "n-shaped" profile) interferes with the partial response coded downstream 38, while a signal profile of the NEXT of the partial response coded signal (again having the double-lobed profile) interferes with the AMI coded upstream 42. Therefore, the NEXT interference has little effect on the transmitted signal integrity of the respectively upstream and downstream signals because the profiles associated with the NEXT are significantly dissimilar in profile and therefore have a different energy distribution. In other words, the downstream receiver responds primarily to lower frequency signals and receives higher frequency cross talk (which can be filtered out), while the upstream receiver responds to higher frequency information bearing signals and rejects much of the lower frequency crosstalk.

Figure 4:
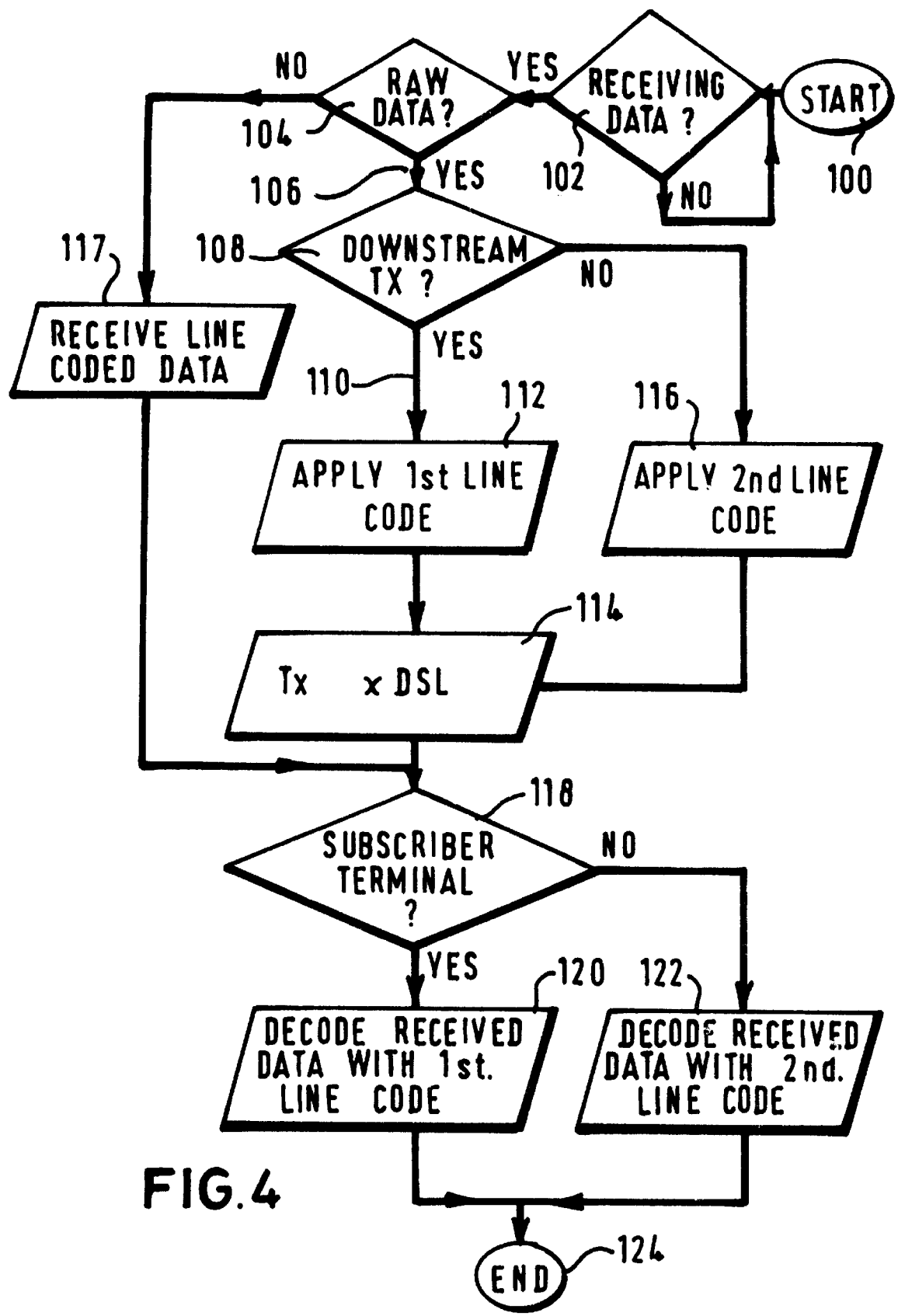
FIG. 4 is a flow diagram of a preferred method of the present invention.

FIG. 4 is a flow diagram of a preferred method of the present invention, which method could be stored in memory and implemented by a control processor (such as DSPs 24–26) of a communication device. The process begins at start block 100. At 102, the processor executes a continuous loop to determine whether it is receiving data (in a duplex, half-duplex or simplex mode). In the negative, the processor remains in the loop, while in the affirmative the process proceeds to step 104 to determine whether the incident data is "raw data" (or not). In this context, raw data should be considered to be information that is not line-coded and not therefore present on the communication resource (e.g the twisted pair). For example, the raw data could be information directly input from a man-machine interface and, as such could be an analog voice pattern or unmodulated ASC II code from a computer keyboard.

In the event of an affirmative response at step 106, the processor realises that it must select and then code the incident (received) data with an appropriate broadband line code At 108, the processor determines whether the direction of transmission, e.g. whether the information is to be transmitted upstream or downstream For a downstream transmission 110. the processor selects and applies the first broadband line code 112, and then transmits xDSL 114. In the event that the transmission is upstream, then the processor selects and applies the second broadband line code 116 before transmission of xDSL at 114.

In default at 104 (implying that the unit is receiving line coded data 117) or subject to receiving xDSL transmission from block 114, a determination is made at 118 as to whether the receiving unit is a subscriber terminal As will now be appreciated, in the affirmative the subscriber terminal selects and decodes 120 the received line coded data (or information) using the first broadband line code, whereas an exchange must select and apply (decode) the second broadband line code to decode 122 the received line coded information (transmitted on the upstream). Following blocks 120 and 122, the process ends 124.

In summary, the net effect of the present invention is to shape one (or both) of the transmitted, baseband coded signals (and hence to change their respective channel responses) and therefore remove cross-talk (and particularly NEXT) between upstream and downstream signals. In the preferred embodiment, the downstream receiver responds primarily to lower frequencies and so is able to filter out cross-talk associated with higher frequencies. Conversely, the upstream receiver responds to higher frequencies and is able to reject much of the lower frequency cross-talk, e.g. through low frequency restoration techniques The overall effect on the system of utilising difference baseband line codes for the different directions of communication flow is to improve system performance.

In another embodiment, an intermediate piece of infrastructure may be arranged to modify (i.e. change) the broadband line code, with such as change based on direction of forward transfer of the information. In this case, it may be desirable to utilise address codes having particular assignments or identities to inform the intermediate piece of infrastructure of the appropriate broadband line code, i e. there could be a change in broadband line codes depending upon whether the intermediate piece of infrastructure was receiving information from an interconnected switch or subscriber terminal for routing to either a different subscriber terminal or another interconnected switch Indeed, in this respect, the present invention considers that selection of a coding scheme for the upstream and downstream direction could be dynamic. More specifically, a controller in an exchange (knowing both the coding capabilities of, for example, an interconnected subscriber terminal and the present coding schemes used for downstream and upstream communications respectively from and to the exchange) could dynamically select the coding scheme to minimise cross-talk between all adjacent wireline resources (i.e. twisted copper pairs) that are coupled thereto.

While the preferred embodiment of the present invention has been described with reference to the use of AMI and partial response codes, it will be readily appreciated that a variety of other coding techniques can be applied to reduce NEXT. For example (and without limitation), in order to lower the frequency or bit rate of transmission, the present invention could utilize: i) binary codes with predominantly low frequencies, e.g. Miller codes; ii) pre-coding to limit higher frequencies, e.g. partial response codings; iii) ternary, quaternary or higher level codes; or iv) pre-filtering of any of the above (through an analog or digital filter). Then, restoration of the higher frequency signals at the receiver could be implemented, for example, by using decision feedback restoration (DFE) during the detection process, or by post-filtering, recording and post-coding the signal after detection. It will be apparent that other line coding schemes could be used. Additionally, the present invention contemplates that baseband coding schemes could be utilised in one direction, while carrier-based schemes (such as CAP, QAM, DMT and others) could be used in the reverse direction.

Similarly, to raise the frequency or bit rate, one can use: i) broadband line codes that have a high frequency content, e.g. AMI, HDB3, Dipulse and WAL2; ii) pre-code to limit low frequency spectrum, e.g. using digital filtering, iii) pre-shape using analog filters, for example; and iv) insert low frequency cuts in the channel response Then, one can restore the lower frequency signals at the receiver either by LFR during the detection process, or post filtering and recording after the detection process.

It will, of course, be appreciated that the above description has been given by way of example only and that modification in detail may be made within the scope of the present invention For example, the transfer of modulated information has been explicitly described in relation to an exchange and a subscriber terminal, however the mechanism of the present invention is equally applicable to intervening infrastructure, such as distribution points implemented as kerb-side units or street cabinets. Additionally, each pair of the twisted copper-pairs incident to the exchange may be subject to different baseband line codes. Furthermore, while the present invention has been described in the context of an overlaid broadband system, it will clearly be appreciated that the concept of applying differing coding schemes to upstream and downstream communications over a wireline communication resource will reduce the effects of NEXT in any form of communication system, including dedicated narrowband or broadband systems.

Furthermore, modification to the present invention may involve the reversal of the frequency components that support data transfer, i.e. coding schemes that support relatively high frequency data transfer could be used in the downstream instead of in the upstream. Additionally, it will be understood that the present invention is generally applicable to wireline schemes that suffer from cross-talk. As such, the present invention may be employed in coaxial lines, for example. Finally, it will be understood that the concepts of the present invention can be employed in transmission schemes that utilise many pairs of (rather than just a single pair of) transmission lines, e.g. a 2 Mbps data rate could be supported by HDSL on three separate sets of twisted pairs each supporting approximately 700 kbps.

I claim:

1. A communication system for transmitting digital data traffic in first and second directions over a conductor pair subscriber loop between an exchange and a user terminal, the system comprising a first digital signal processor disposed at the exchange, a first memory associated with said first signal processor, a second digital signal processor disposed at the user terminal, and a second memory associated with said second signal processor, wherein said first and second memories each store a first and a second baseband coding scheme for encoding digital signals sent over said loop and for decoding encoded signals received from said loop, wherein signals in said first direction are encoded via said first coding scheme and signals in said second direction are encoded via said second coding scheme, and wherein said first and second baseband coding schemes have respective high and low frequency channel responses such that cross-talk interference between the first and second directions is reduced.

2. The communication system of claim 1, wherein communication between the exchange and the user terminal contains broadband signaling and the first and second coding schemes are respective broadband line codes.

3. The communication system of claim 2, wherein the broadband signaling is overlaid over a narrowband signal.

4. The communication system of claim 3, wherein the narrowband signal is a voice signal.

5. The communication system of claim 2, wherein the exchange has connected thereto a plurality of wireline resources that support a plurality of calls, the exchange further containing a controller arranged to select a coding scheme from the first and second coding schemes such as to minimize cross-talk interference between the plurality of calls.

6. The communication system of claim 5, wherein the coding scheme is selected based upon routing information pertaining to the user terminal to which the exchange is to send the modulated information.

7. The communication system of claim 5, wherein the first coding scheme produces a signal profile in which modulated information is concentrated at relatively low frequencies while the second coding scheme produces a signal profile in which modulated information is concentrated at relatively high frequencies.

8. The communication system of claim 7, wherein the exchange and the user terminal each further comprise a filter coupled to receive the modulated information, the filter arranged to filter out the signal profile principally associated with near end cross-talk interference.

9. The communication system of claim 8, wherein the first coding scheme produces a signal profile in which modulated information is concentrated at relatively low bit rates while the different coding scheme produces a signal profile in which modulated information is concentrated at relatively high bit rates.

10. A communication device for enabling the transmission of digital data traffic in first and second directions over a conductor pair subscriber loop between an exchange and a user terminal, the device comprising; a digital signal processor, a controller, and a memory associated with said signal processor, wherein said memory stores a first and a second baseband coding scheme for encoding digital signals sent over said loop and for decoding encoded signals received from said loop, wherein the controller is arranged to select and use said first baseband coding scheme for encoding signals in said first direction and said second baseband coding scheme for decoding signals in said second direction, and wherein said first and second baseband coding schemes have respective high and low frequency channel responses such that cross-talk interference between the first and second directions is reduced.

11. The communication device of claim 10, wherein the broadband signaling is overlaid over a narrowband channel.

12. The communication device of claim 11, wherein the narrowband channel is a voice channel.

13. The communication device of claim 11, wherein the first coding scheme produces a signal modulation profile in which modulated data is concentrated at relatively low frequencies while the at least one other different coding scheme produces a signal modulation profile in which modulated data is concentrated at relatively high frequencies.

14. The communication device of claim 13, further comprising a filter coupled to receive the modulated data and being arranged to filter out a signal modulation profile principally associated with near end cross-talk interference.

15. The communication device of claim 14, wherein the first coding scheme produces a signal modulation profile in which modulated data is concentrated at relatively low bit rates while the at least one other different coding scheme produces a signal modulation profile in which modulated data is concentrated at relatively high bit rates.

16. A method of transmitting digital data traffic in first and second directions over a conductor pair subscriber loop between an exchange and a user terminal each incorporating a respective digital signal processor, and a memory associated with that signal processor, each said memory storing a first and a second baseband coding scheme for encoding digital signals sent over said loop and for decoding encoded signals received from said loop; the method comprising encoding signals transmitted over the loop in said first direction via said first baseband coding scheme, and encoding signals transmitted over the loop in said second direction via said second baseband coding scheme, and wherein said first and second baseband coding schemes have respective high and low frequency channel responses such that cross-talk interference between the first and second directions is reduced.

17. The method of claim 16, wherein broadband data is overlaid over a narrowband data.

18. The method of claim 17 wherein the exchange has a plurality of wireline resources emanating therefrom that support a plurality of calls and wherein the exchange memory has more than two different coding schemes, the method further comprising the step of:

dynamically assigning coding schemes to upstream and downstream transmissions of the plurality of calls such as to minimize cross-talk interference between the plurality of calls.

19. The method of claim 18, wherein the coding scheme is selected based upon routing information pertaining to the user terminal to which the exchange is to send the modulated information.

20. The method of claim 16, wherein the first coding scheme produces a signal modulation profile in which modulated data is concentrated at relatively low frequencies while the second coding scheme produces a signal modulation profile in which modulated data is concentrated at relatively high frequencies.

21. The method of claim 16, wherein the first coding scheme produces a signal modulation profile in which modulated data is concentrated at relatively low bit rates while the second coding scheme produces a signal modulation profile in which modulated data is concentrated at relatively high bit rates.

* * * * *